Aug. 9, 1932.     J. D. McLEOD     1,871,220
GLASS CUTTING TABLE
Filed Sept. 12, 1930     2 Sheets-Sheet 2
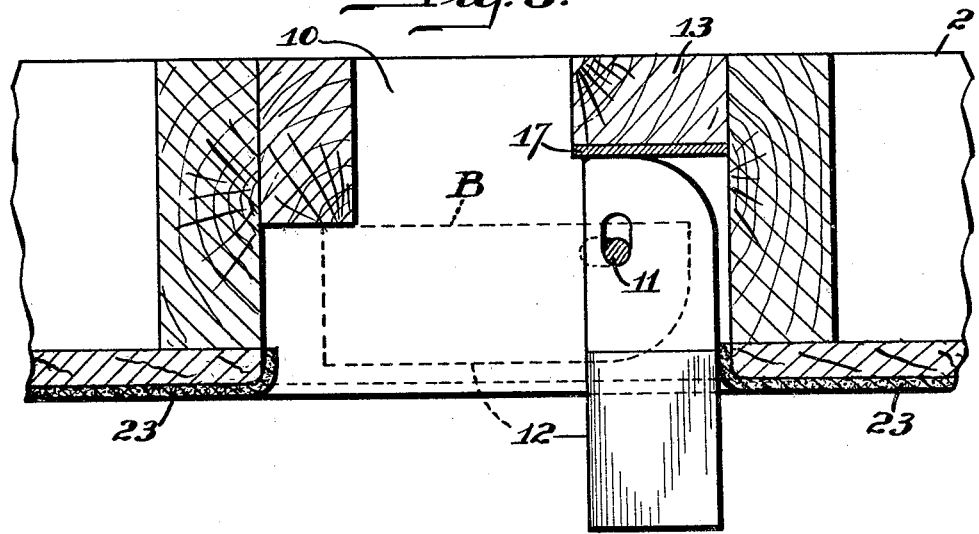
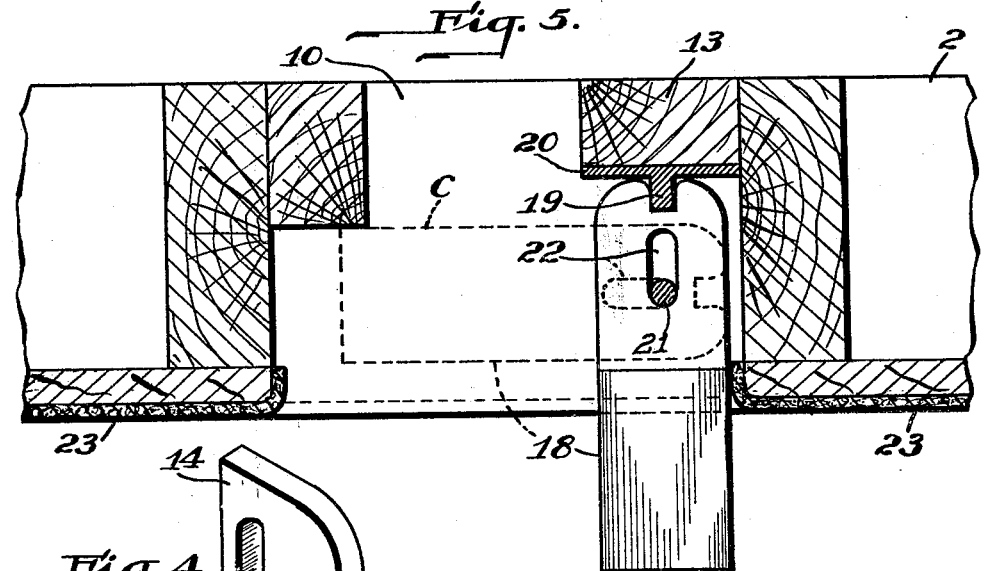
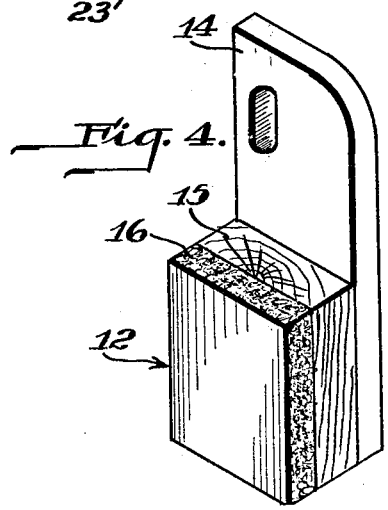
INVENTOR
John D. McLeod
by
James C. Bradley
Atty Patented Aug. 9, 1932

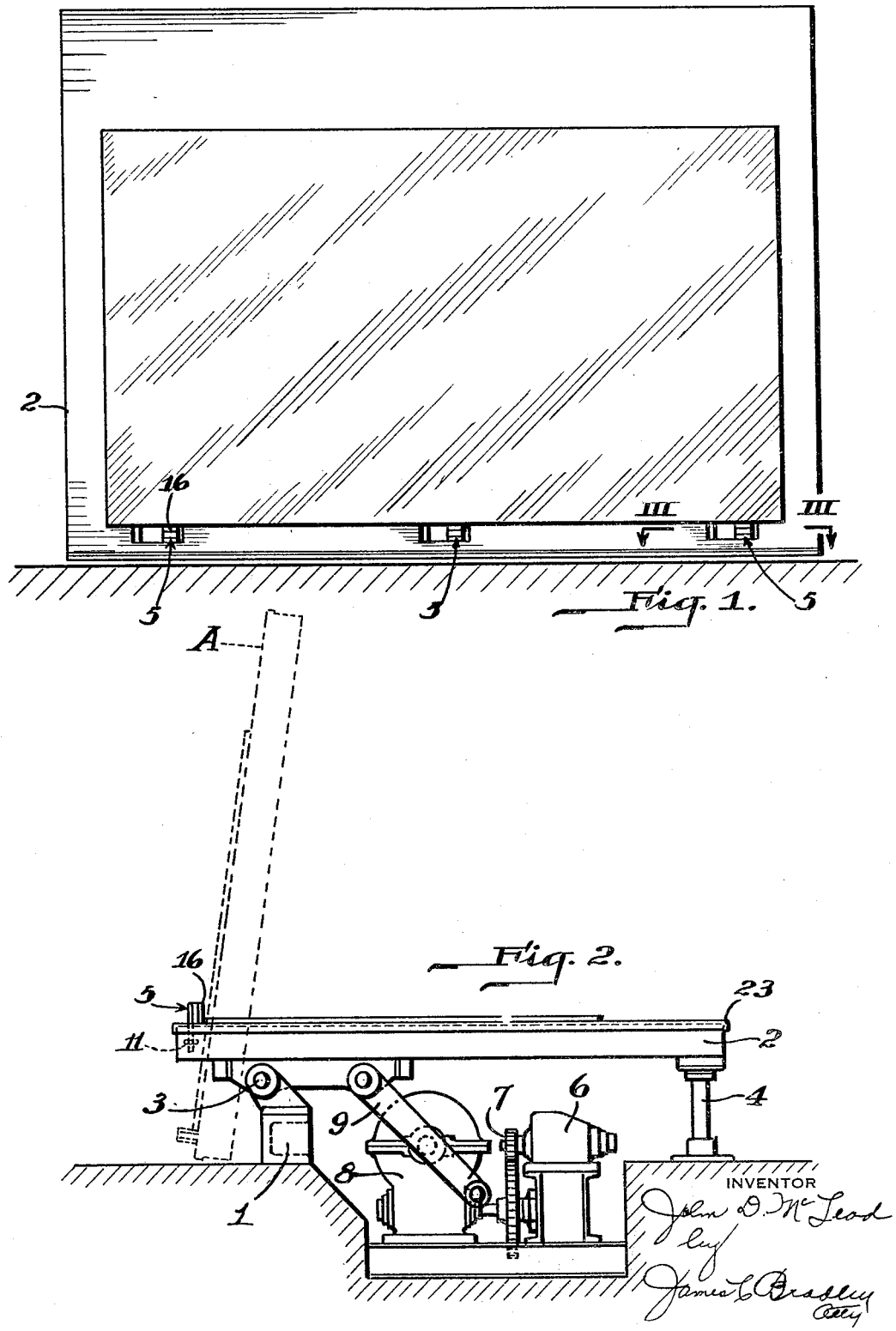
Aug. 9, 1932.   J. D. McLEOD   1,871,220
GLASS CUTTING TABLE
Filed Sept. 12, 1930   2 Sheets-Sheet 1

1,871,220

UNITED STATES PATENT OFFICE

JOHN D. McLEOD, OF OAKMONT, PENNSYLVANIA, ASSIGNOR TO PITTSBURGH PLATE GLASS COMPANY, A CORPORATION OF PENNSYLVANIA

GLASS CUTTING TABLE

Application filed September 12, 1930. Serial No. 481,446.

The invention relates to glass cutting tables of the tilting type. It has for its principal objects the provision of improved means for supporting the glass sheet at its edge when the table is in inclined position, which is the position occupied when a glass sheet is placed on the table by means of the usual overhead crane and vacuum frame. As later set forth, these means comprise movable stops which can readily be moved out of the way after the table is moved to horizontal position, thus leaving the entire upper surface of the table free from obstruction during the cutting operation. Certain embodiments of the invention are illustrated in the accompanying drawings, wherein:

Figure 1 is a front elevation of the table equipped with the improvement. Fig. 2 is a side elevation showing the table in tilted position in dotted lines. Fig. 3 is a section on the line III—III of Fig. 1. Fig. 4 is a perspective of one of the stop blocks. And Fig. 5 is a section through a modification.

Referring to the general arrangement as shown in Figs. 1 and 2, 1 is a suitable framework, and 2 is the table mounted for tilting movement on the frame about the pivot 3, 4 being a standard secured in the floor for supporting the rear end of the table when in normal cutting position. The table is tilted to the dotted line position A when a sheet of glass is to be placed thereon, the sheet of glass being carried by a vacuum frame not shown, and placed against the inclined face of the table with its lower edge in engagement with the stop blocks 5, 5, 5, to which the invention particularly relates. The table is tilted by any suitable power means constituting no part of the present invention. The means shown comprises a motor 6 operating through the gearing 7, reduction gearing in the casing 8 and the crank member 9.

Three stop means 5 are shown, but any suitable number may be used depending upon conditions. Each of the stopblocks is mounted in a recess 10 in the table extending back from the face thereof and provided with a transverse pivot pin 11. The stop block 12 is provided with a slot through which the pin extends, thus permitting a swinging movement and a longitudinal movement of the block in the recess. The block at its rear end engages a shoulder or locking means 13 so that when the block is in the position shown in Fig. 3, it is held against rotating about its pivot pin 11. This is the position occupied when the table is in tilted position and the stop blocks come into play for supporting the weight of the sheet of glass after it has been released from the vacuum frame. After the table is tilted back to horizontal position and it is desired to have the upper surface of the table free from obstruction, the stop blocks may be gotten out of the way by moving them upward so that their inner ends are free from the locking means 13, at which time they can be swung around their pivots to the dotted line position B. The blocks are preferably made of steel plates 14 having on one side a wooden block 15 to which a felt strip 16 is secured (Fig. 4). The locking shoulder 13 (Fig. 3) is preferably provided on its face with a wear strip 17 of steel.

Fig. 5 illustrates a modification in which a different locking means is provided for the end of the stop block 18. The locking means in this instance comprises a projecting lug 19 on the plate 20 and such lug engages a recess in the end of the stop block when the parts are in the position shown in Fig. 5. In order to release the stop block and move it to the dotted line position C, the block is first pulled endwise to release it from the lug 19, after which it may be turned to the dotted line position. In this construction as in the other, the block is mounted upon a pin 21 which engages a slot 22 in the block.

What I claim is:

1. In combination, a cutting table mounted for tilting movement about an axis adjacent one side of the table and provided with a recess extending in from its face adjacent said side, a stop block mounted in such recess for swinging movement so that in one position the block projects above the surface of the table and in another position it lies below said surface and also mounted for limited endwise movement upon its pivot, and means in the slot which engages the block when in one position of endwise movement and prevents said swinging movement.

2. In combination, a cutting table mounted for tilting movement about an axis adjacent one side of the table, and provided with a recess extending in from its face adjacent said side, a pivot in said recess, a stop block having a slot extending lengthwise of the block through which the pivot extends, and locking means in the recess engaging the end of the block and preventing its swinging movement about the pivot when the block is in one position of endwise movement with its end projecting above the face of the table, the slot and locking means being arranged so that the block may be disengaged from the locking means by moving it endwise away from the locking means, after which the block may be swung laterally in the recess about its pivot to bring it below the surface of the table.

3. In combination, a cutting table mounted for tilting movement about an axis adjacent one side of the table and provided with a recess extending inwardly from its face adjacent said side, a pivot in said recess, a stop block having a slot extending lengthwise thereof through which the pivot extends and also provided at its inner end with a locking recess, and a locking lug in opposition to said locking recess adapted to engage said recess and prevent rotation of the block about the pivot when the block is in its inner position of endwise adjustment upon its pivot, the slot and locking recess being so arranged that the block may be disengaged and swung to position below the face of the table upon moving it to its outer position on its pivot.

In testimony whereof, I have hereunto subscribed my name this 19th day of August, 1930.

JOHN D. McLEOD.